US010592303B2

(12) United States Patent
Ryu

(10) Patent No.: US 10,592,303 B2
(45) Date of Patent: Mar. 17, 2020

(54) METHOD AND APPARATUS FOR DEVICE-SPECIFIC COMMUNICATION BETWEEN APPLICATION PROGRAMS

(71) Applicant: Samsung Electronics Co., Ltd., Suwon-si, Gyeonggi-do (KR)

(72) Inventor: Young-Sun Ryu, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/131,847

(22) Filed: Sep. 14, 2018

(65) Prior Publication Data

US 2019/0012215 A1     Jan. 10, 2019

Related U.S. Application Data

(63) Continuation of application No. 15/647,875, filed on Jul. 12, 2017, which is a continuation of application No. 15/023,817, filed as application No. PCT/KR2014/008770 on Sep. 22, 2014, now Pat. No. 9,720,745.

(30) Foreign Application Priority Data

Sep. 23, 2013    (KR) ........................ 10-2013-0112794

(51) Int. Cl.
    *G06F 9/54*          (2006.01)
    *H04L 29/08*      (2006.01)

(52) U.S. Cl.
    CPC ................ *G06F 9/54* (2013.01); *G06F 9/544* (2013.01); *H04L 67/02* (2013.01); *H04L 67/10* (2013.01); *H04L 67/141* (2013.01)

(58) Field of Classification Search
    CPC .... G06F 9/547; H04L 29/06; H04L 29/08072
    USPC .................. 719/311; 709/219, 227, 230, 237
    See application file for complete search history.

(56) References Cited

U.S. PATENT DOCUMENTS

| 8,914,832 | B2 | 12/2014 | Yamagishi |
| 8,937,637 | B2 | 1/2015 | Deyerle et al. |
| 9,459,936 | B2 | 10/2016 | Fallows et al. |
| 2002/0059517 | A1 | 5/2002 | Haviv et al. |

(Continued)

FOREIGN PATENT DOCUMENTS

| CN | 101263483 A | 9/2008 |
| CN | 103095669 A | 5/2013 |

(Continued)

OTHER PUBLICATIONS

Chinese Office Action dated Jan. 16, 2019, issued in Chinese Application No. 201480052441.4.

(Continued)

*Primary Examiner* — Andy Ho
(74) *Attorney, Agent, or Firm* — Jefferson IP Law, LLP

(57) ABSTRACT

A method for providing communication between application programs running via devices connected to a same network is provided. The method includes an operation for connecting a first application program, which is running in a first device via a web socket server in the first device, with a second application program, which is running in a second device, and an operation for transmitting and receiving data between the second application program and the first application program via the web socket server.

12 Claims, 6 Drawing Sheets

(56) References Cited

U.S. PATENT DOCUMENTS

| | | |
|---|---|---|
| 2004/0001459 A1 | 1/2004 | Chandhok et al. |
| 2006/0080402 A1 | 4/2006 | Han et al. |
| 2007/0061434 A1 | 3/2007 | Schmieder et al. |
| 2008/0098450 A1 | 4/2008 | Wu et al. |
| 2009/0143055 A1 | 6/2009 | Emek |
| 2010/0281107 A1 | 11/2010 | Fallows et al. |
| 2012/0221725 A1 | 8/2012 | Schroeder, Jr. et al. |
| 2013/0232223 A1 | 9/2013 | Ma |
| 2014/0214967 A1* | 7/2014 | Baba ............... H04H 20/08 709/205 |
| 2014/0266794 A1 | 9/2014 | Brown et al. |
| 2017/0205974 A1 | 7/2017 | Lund et al. |

FOREIGN PATENT DOCUMENTS

| | | |
|---|---|---|
| CN | 103297411 A | 9/2013 |
| EP | 2 608 479 A1 | 6/2013 |
| JP | 2013-66159 A | 4/2013 |
| KR | 10-2006-0031913 A | 4/2006 |
| KR | 10-2007-0060957 A | 6/2007 |
| KR | 10-2012-0080892 A | 7/2012 |
| RU | 2005-102012 A | 7/2005 |
| WO | 2013/031556 A1 | 3/2013 |

OTHER PUBLICATIONS

Yusuke Fukai, et al., Web Browser based GUI for TV. In: 2012 IEEE Global Conference on Consumer Electronics, pp. 579-580., Oct. 2, 2012.

Chinese Office Action dated Jul. 2, 2018, issued in the Chinese Application No. 201480052441.4.

Russian Office Action dated Jun. 26, 2018, issued in the Russian Application No. 2016115536.

Whale aircraft, HTML 5, Introduction to smart phone app development, Nikkei software, Japan, Nikkei BP company, Nov. 24, 2012, vol. 16, No. 1, pp. 110-115 (Literature showing a well-known technology).

Japanese Office Action dated Sep. 25, 2018, issued in Japanese Application No. 2016-516572.

* cited by examiner

METHOD AND APPARATUS FOR DEVICE-SPECIFIC COMMUNICATION BETWEEN APPLICATION PROGRAMS

CROSS-REFERENCE TO RELATED APPLICATION(S)

This application is a continuation application of prior application Ser. No. 15/647,875, filed on Jul. 12, 2017; which is a continuation application of application Ser. No. 15/023,817, filed on Mar. 22, 2016, which has issued as U.S. Pat. No. 9,720,745 on Aug. 1, 2017, which is a national stage application under 35 U.S.C. § 371 of an International application filed on Sep. 22, 2014 and assigned application number PCT/KR2014/008770, which claimed the benefit of a Korean patent application filed on Sep. 23, 2013 in the Korean Intellectual Property Office and assigned Serial number 10-2013-0112794, the entire disclosure of which is hereby incorporated by reference.

TECHNICAL FIELD

The present disclosure relates to a method and apparatus for communication between applications running on devices connected to the same network.

BACKGROUND

With development of wireless communication technology, real-time bidirectional data communication and websocket communication that can support a plurality of concurrent users have been introduced. The websocket communication is based on communication between servers and clients.

FIG. 1 is a view for describing an example of a general websocket communication method according to the related art.

Referring to FIG. 1, it is assumed that a server 102 supports websocket communication, and first to fourth clients 104, 106, 108, and 110 connect to the server 102 using a websocket protocol to transmit/receive data to/from the server 102. In FIG. 1, for convenience of description, a server supporting websocket communication is shown, however, two or more servers may exist.

The websocket communication overcomes the disadvantage (that is, unidirectional communication) of hyper text transfer protocol (HTTP) which is one of typical communication methods to provide seamless bidirectional communication between servers and clients. Also, since the websocket communication can easily interwork with hypertext markup language 5 (HTML 5) without having a server to perform complicated programming, the websocket communication is expected to be widely applied in environments requiring bidirectional communication.

For this reason, studies into a method for applying the websocket communication to communication between applications running on different devices are underway. Accordingly, detailed procedures for applying websocket communication designed for bidirectional communication between servers and clients to communication between applications are needed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for communication between applications running on different devices connected to the same network.

Another aspect of the present disclosure is to provide an apparatus and method for using a websocket protocol for communication between an application running on a first device and a slave application interworking with the application and running on a second device.

Another aspect of the present disclosure is to provide communication means for communication between applications running on different devices so that a user can create, for example, an application of a second device interworking with an application of a first device. Accordingly, the user can create a remote control application that can control the first device through the second device, and also can manipulate an input application of the second device through the first device.

In accordance with an aspect of the present disclosure, a method for communication between a plurality of applications running on a plurality of devices connected to a same network is provided. The method includes connecting a first application running on a first device to a second application running on a second device through a websocket server in the first device and transmitting and receiving data between the first application and the second application through the websocket server.

In accordance with another aspect of the present disclosure, a first device for communication between a plurality of applications running on a plurality of devices connected to a same network is provided. The first device includes a websocket server configured to provide a connection between a first application running on the first device and a second application running on a second device, and to transmit and receive data between the first application and the second application through the connection.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The various embodiments of the present disclosure suggest an apparatus and method for communication between applications running on different devices connected to the same network. According to an embodiment, the present disclosure suggests an apparatus and method for using a websocket (WS) protocol for communication between an application running on a first device and a slave application interworking with the application and running on a second device in an environment where a plurality of devices are connected to the same network, for example, a home network.

Figure 1:
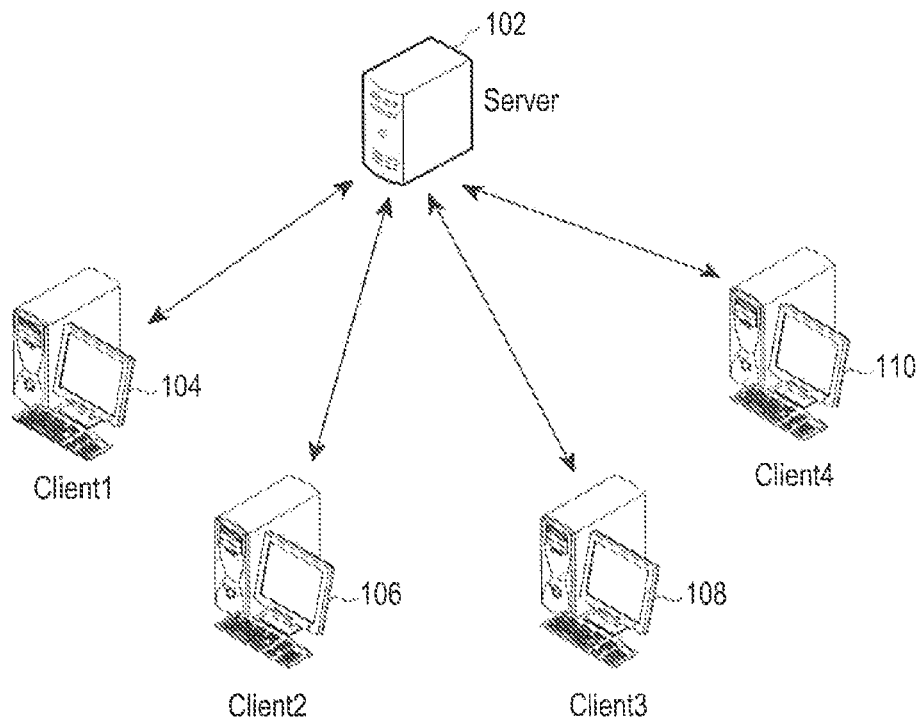
FIG. 1 is a view for describing an example of a method in which general websocket operates according to the related art.
Figure 2:
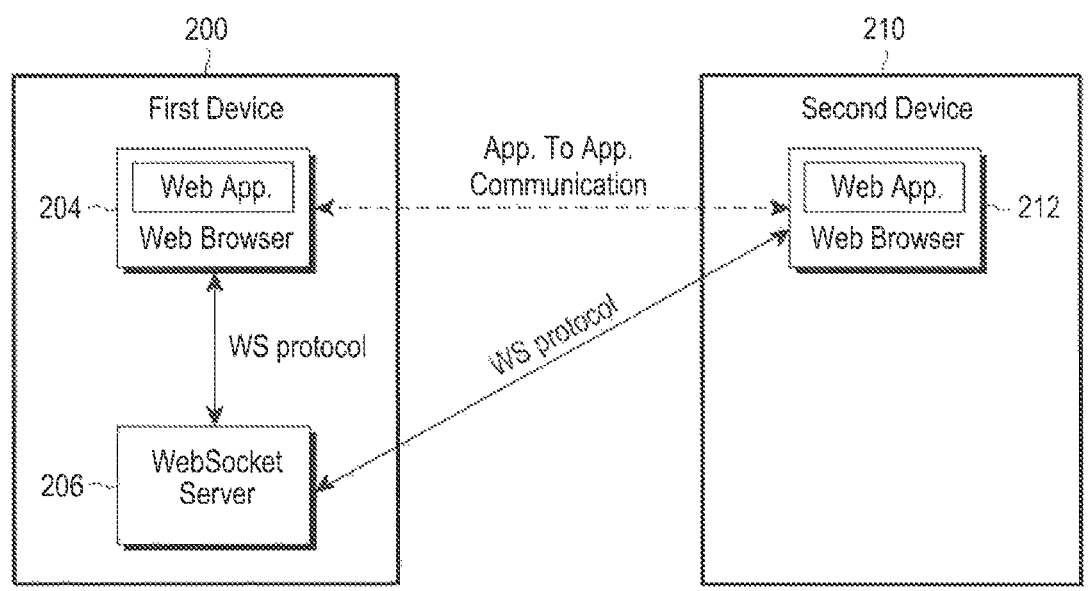
FIG. 2 shows an example of a basic configuration for describing communication between applications according to an embodiment of the present disclosure.

FIG. 2 shows an example of a basic configuration for describing communication between device-specific applications according to an embodiment of the present disclosure. For convenience of description, FIG. 2 shows components according to the embodiment of the present disclosure. Accordingly, the components may be integrated into one unit or divided into a plurality of sub units according to their functions, according to an operator's intention or situation.

Referring to FIG. 2, for convenience of description, it is assumed that a first device 200 and a second device 210 are connected to the same network, for example, a home network. However, there may exist other devices connected to the home network than the first device 200 and the second device 210, which are not shown in FIG. 2.

The first device 200 may be defined as a master device on which an arbitrary application runs. For example, the first device 200 may be a digital television (DTV) or a public terminal such as a set-top box (STB). The first device 200 according to an embodiment of the present disclosure may include, for example, a web browser 204 and a WS server 206. The web browser 204 may correspond to a component that can drive a web application, and the WS server 206 may be a component additionally provided for communication between an application of the first device 200 and an application of another device, according to an embodiment of the present disclosure. For example, the WS server 206 may provide a connection and communication between an application running on the first device 200 and an application(s) running on the second device 210.

The second device 210 may be defined as a slave device interworking with one of devices connected to the home network to execute an application, which is not shown in FIG. 2. The second device 210 may be a personal terminal, such as a mobile communication terminal, a tablet personal computer (PC), and a smart phone. The second device 210 according to an embodiment of the present disclosure may include, like the first device 200, a web browser 212 that can drive a web application. In this specification, an example in which application-to-application communication is performed on a web application will be described. However, the application may be any other application that supports an application program interface (API) and procedures described in the present disclosure. For example, the application may be a native application running on Android operation system (OS) or iOS for iPhone.

The application running on the first device 200 cannot directly communicate with the application (that is, a web application) running on the second device 210. Therefore, in the embodiment of the present disclosure, the WS server 206 included in the first device 200 may be used as if it is a proxy to enable device-specific applications to connect to each other and communicate with each other. That is, the WS server 206 may act as a relay for connection and communication between device-specific applications. More specifically, in the current embodiment, the web browser 204 of the first device 200 may communicate with the WS server 206 of the first device 200 using a WS protocol, and likewise, the web browser 212 (or a native application) of the second device 210 may communicate with the WS server 206 through the WS protocol.

Hereinafter, for convenience of description, an apparatus and methods for supporting communication between device-specific applications, according to various embodiments of the present disclosure, will be described based on the configuration shown in FIG. 2.

Figure 3:
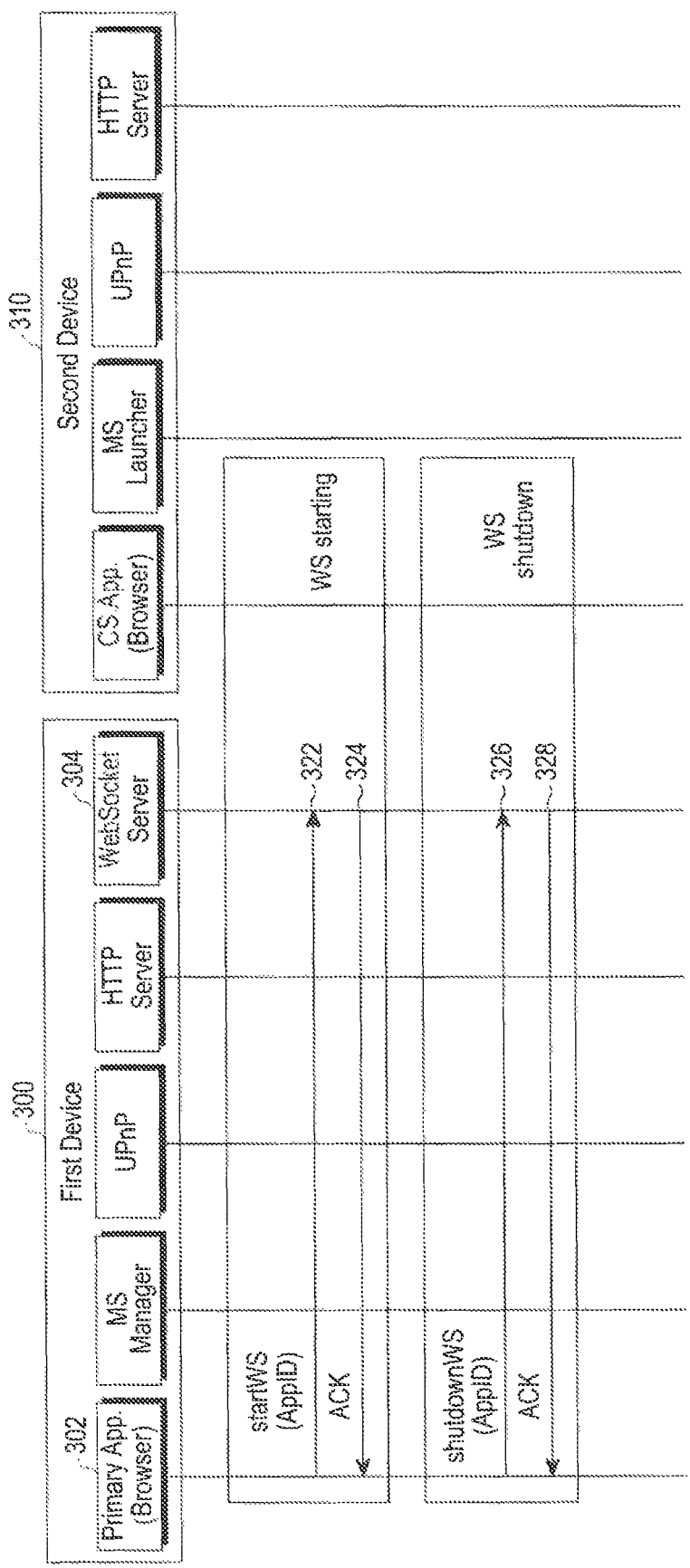
FIG. 3 is a flowchart illustrating an example of a method of starting and shutting down a websocket server in a first device according to an embodiment of the present disclosure.

FIG. 3 is a flowchart illustrating an example of a method of starting and shutting down a WS server in a first device according to an embodiment of the present disclosure. For convenience of description, it is assumed that the first device 300 is a DTV connected to a home network, and the second device 310 is a mobile device connected to the home network. However, the first device 300 and the second device 310 may be any other devices as long as they can support methods according to the present disclosure.

First, operation in which a first device 300 starts a WS server 304 will be described. Referring to FIG. 3, a web application (hereinafter, referred to as a "Primary App") 302 of the first device 300 may transfer an API to the WS server 304 of the first device 300 to start the WS server 304, in operation 322. Herein, the API may be startWS as seen in Table 1 below.

TABLE 1

| API | Description | Factor | Ack |
|---|---|---|---|
| startWS (Unit AppID) | Start WS Server of Device | Unit AppID: Identifier of Application to Interwork with WS Server | True: When Starting Succeeds False: When Starting Fails |
| shutdownWS (Unit AppID) | Shut down WS Server of Device | Unit AppID: Identifier of Application to Interwork with WS Server | True: When Shutting down Succeeds False: When Shutting down Fails |

At this time, the startWS may provide AppID which is an identifier (ID) of the Primary App 302 for interworking with the Primary App 302. Herein, the AppID of the Primary App 302 may be an ID or uniform resource locator (URL) that is used to identify the Primary App 302. Then, the WS server 304 may start in order to communicate with the Primary App 302 corresponding to the AppID, and transmit an acknowledgement (ACK) signal indicating starting completion to the Primary App 302 in operation 324.

Thereafter, operation in which the first device 300 shuts down the WS server 304 will be described.

The Primary App 302 may transfer an API to the WS server 304 of the first device 300 to shut down the WS server 304 that is running, in operation 326. The API that the Primary App 302 calls may be ShutdownWS as seen in Table 1. Likewise, the ShutdownWS may also provide the AppID. Then, the WS server 304 may shut down communication with the Primary App 302 corresponding to the AppID, and transfer an ACK signal indicating shut-down completion to the Primary App 302 of the first device 300 in operation 328.

In the embodiment of FIG. 3, a method in which the first device 300 itself starts and shuts down the WS server 304 for a specific application in the first device 300 has been described. According to an embodiment, after a WS server of a first device that can be used in common starts, APIs which will be described in the following procedure may enable an application of a second device to interwork with the WS server of the first device.

Figure 4:
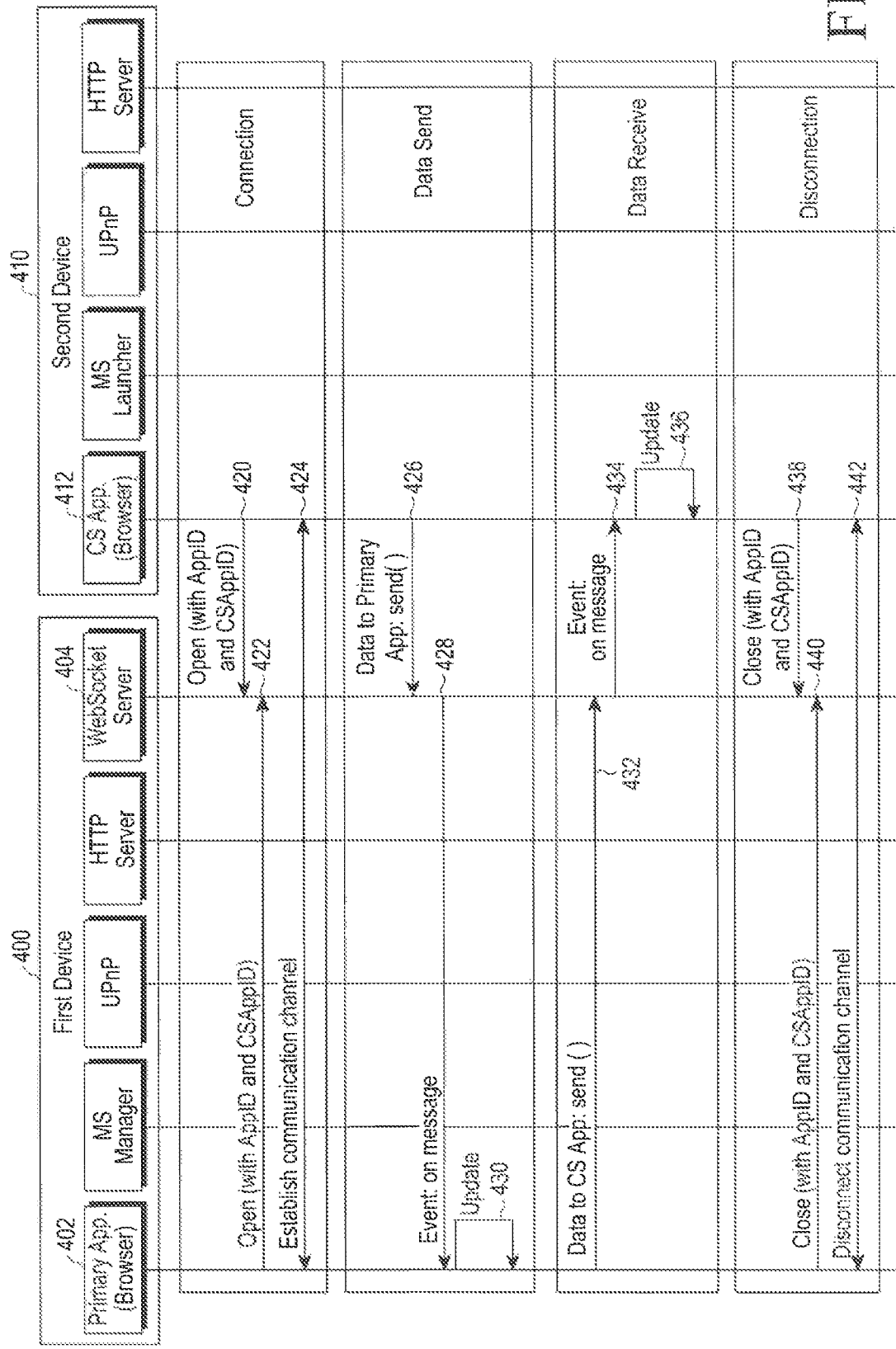
FIG. 4 is a flowchart illustrating an example of a method in which an application of a second device communicates with an application of a first device according to an embodiment of the present disclosure.

FIG. 4 is a flowchart illustrating an example of a method in which an application of a second device communicates with an application of a first device according to an embodiment of the present disclosure. The following Table 2 shows examples of APIs for communication between device-specific applications.

Referring to FIG. 4, an application (hereinafter, referred to as "companion screen (CS) App") 412 of a second device 410 may create a WS object, and then request a WS server 404 of a first device 400 to call an Open( ) API to establish a communication channel operation 420. The open( ) API may transfer an ID (also, referred to as AppID) of a Primary App 402 and an ID (also, referred to as CSAppID) of the CS App 412. Then, the Primary App 402 may create a WS object using the AppID and the CSAppID, and then request the WS server 404 to call the open( ) API to establish a communication channel, in operation 422. Likewise, the open( ) API of the Primary App 402 may also transfer the AppID and the CSAppID.

Then, the WS server 404 of the first device 400 may establish a communication channel between the Primary App 402 corresponding to the AppID and the CS App 412 corresponding to the CSAppID, in operation 424. If the communication channel is established according to the above-described process, the CS App 412 can communicate with the Primary App 402 through the communication channel. Likewise, the Primary App 402 may also communicate with the CS App 412 through the communication channel. More specifically, a method in which each of the Primary App 402 and the CS App 412 connects to the WS server 404 in operations 420 to 424 may use, for example, Table 3, below.

TABLE 3

Method of connecting to a WS server of which an address is ws://192.168.1.52 (a first device and a second device)
ws://192.168.1.52/AppID/CSAppID As described above, the WS server 404 may determine whether information acquired from the open( ) API of the Primary App 402 is identical to information acquired from the CS App 412. In the embodiment of FIG. 4, a case in which each of the Primary App 402 and the CS App 412 transmits AppID and CSAppID as information for establish-

TABLE 2

| API | Description | Factor | Ack |
|---|---|---|---|
| startWS (Unit AppID) | Start WS Server | Unit AppID: Application for Starting WS Server | True: When Starting Succeeds False: When Starting Fails |
| ShutdownWS (Unit AppID) | Shut down WS Server | Unit AppID: Application for Shutting down WS Server | True: When Shutting down Succeeds False: When Shutting down Fails |
| check_channel (AppID, CSAppID) | Check whether Communication Channel Has Been Established between Application (AppID) of First Device and Application (CSApp) of Second Device | AppID: Application ID of First Device CSAppID: Application ID of Second Device | True: When Specific Channel Has Been Established False: When No Specific Channel Has Been Established |
| getHbbTVAppID( ) | Get AppID of First Device | None | Unit HbbTVID: AppID of First Device |
| getCSAppID( ) | Get AppID of Second Device | None | Unit CSAppID: AppID of Second Device | ing a communication channel has been described as an example. If the WS server 404 determines that information acquired from the open( ) API of the Primary App 402 is identical to information acquired from the CS App 412, the WS server 404 may relay a connection to the Primary App 402 and a connection to the CS App 412 to thus establish a communication channel between the Primary App 402 and the CS App 412. Accordingly, the connection between the Primary App 402 and the WS server 404 and the connection between the CS App 412 and the WS server 404 may be allocated the same channel ID. The channel ID may be generated as a unique value based on the address of the WS server 404, the AppID of the Primary App 402, and the CSAppID of the CS App 412, for example, as seen in Table 3.

Thereafter, if data that is to be transmitted from the CS App 412 to the Primary App 402 is generated, the CS App 412 may call a send( ) API to transmit the generated data to the WS server 404, in operation 426. Then, the WS server 404 may call an Event (on message) to inform the Primary App 402 that data has been received, in operation 428. Then, the Primary App 402 may reflect the received data to itself, in operation 430. For example, if the Primary App 402 is a web application, operation 430 may be performed through document object model (DOM) update.

Meanwhile, if a part of the Primary App 402 has changed, the Primary App 402 may call the send( ) API to transmit information about the changed part to the WS server 404, in operation 432. Then, the WS server 404 of the first device 400 may transfer the information to the CS App 412, through the communication channel between the Primary App 402 and the CS App 412, established according to the above-described process, in operation 434. At this time, the information may be transferred through an Event (on message). The CS App 412 may receive the information, and reflect the information to itself, like operation 430, in operation 436.

Thereafter, if communication is completed, the CS App 412 may call a close( ) API to transmit a request for closing the communication channel with the Primary App 402 to the WS server 404, in operation 438. Likewise, the Primary App 402 may also call the close( ) API to transmit a request for closing the communication channel with the Primary App to the WS server 404, in operation 440. Then, the WS server 404 may disconnect the Primary App 402 from the CS App 412. Accordingly, the Primary App 402 may be disconnected from the CS App 412, in operation 442.

Figure 5:
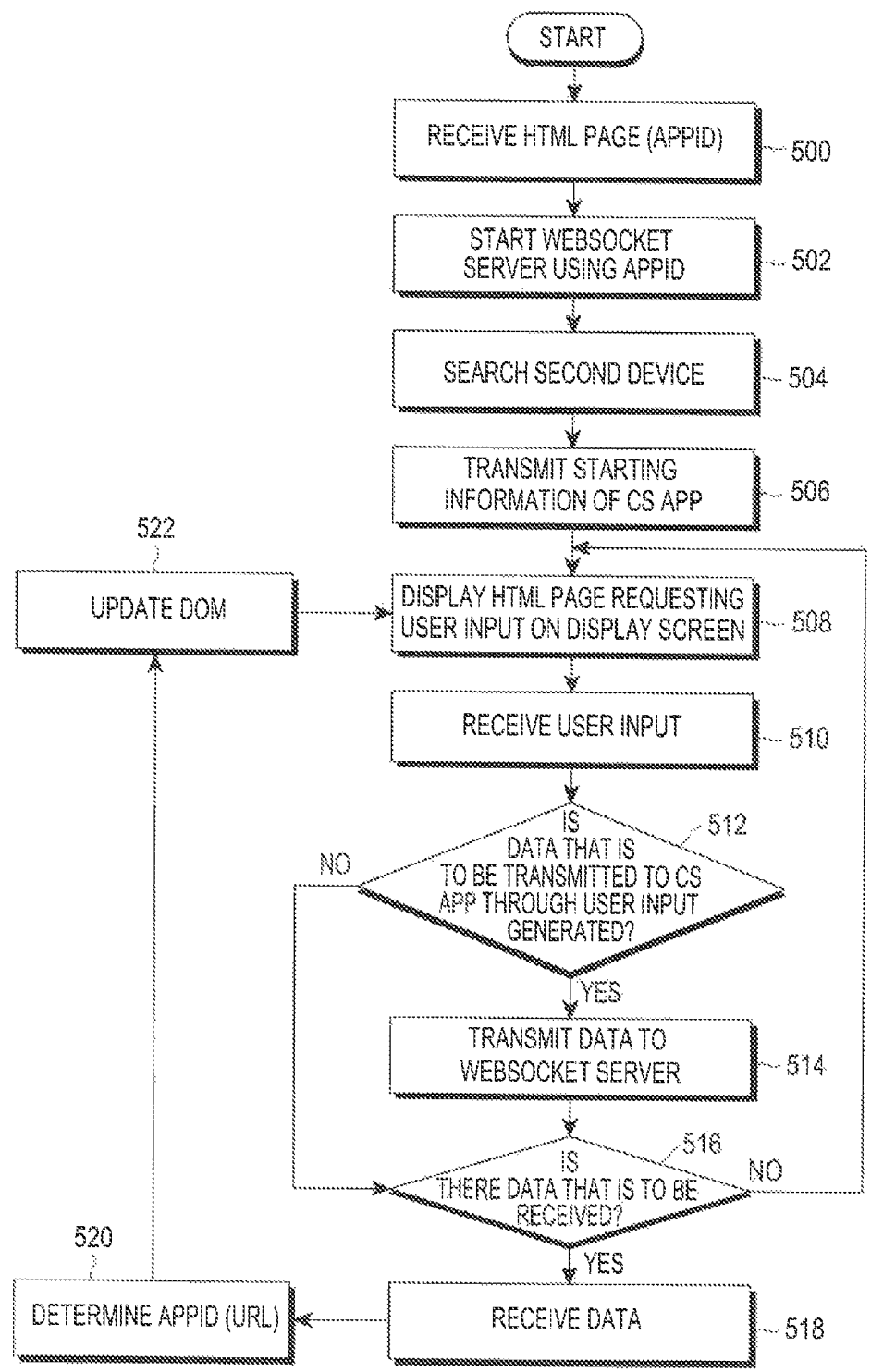
FIG. 5 is a flowchart illustrating an example of an operation method of a first device according to an embodiment of the present disclosure.

FIG. 5 is a flowchart illustrating an example of an operation method of a first device according to an embodiment of the present disclosure.

Referring to FIG. 5, a first device may receive a hypertext markup language (HTML) page, in operation 500. The HTML page may include AppID indicating a Primary App of the first device. Then, the first device may start a WS server using the AppID according to an API called from the HTML page, in operation 502.

Then, the Primary App may search an available second device in a plurality of devices connected to a network to which the first device is connected, in operation 504. Then, the Primary App may transmit starting information of a CS App of the found second device to the second device, in operation 506. Thereafter, the first device may display a HTML page for requesting a user input on a display screen, in operation 508. If the first device receives a user input in operation 510, the first device may determine whether data that is to be transmitted to the CS App through the user input is generated, in operation 512. If the first device determines that no data that is to be transmitted to the CS App is generated, the first device may proceed to operation 516.

If the first device determines that data that is to be transmitted to the CS App is generated, the first device may transmit the data to the WS server, in operation 514. Then, the first device may determine whether there is data that is to be received through the WS server, in operation 516. If the first device determines that there is no data that is to be received through the WS server, the first device may proceed to operation 508 to wait another user input.

If the first device determines that there is data that is to be received through the WS server, the first device may receive the data through the WS server, in operation 518. Then, the first device may determine whether an application ID acquired from the received data is AppID of the first device, in operation 520. If the first device determines that the application ID acquired from the received data is the AppID of the first device, the first device may update DOM in operation 522 to display HTML to which the received data is reflected on the display screen, in operation 508.

Figure 6:
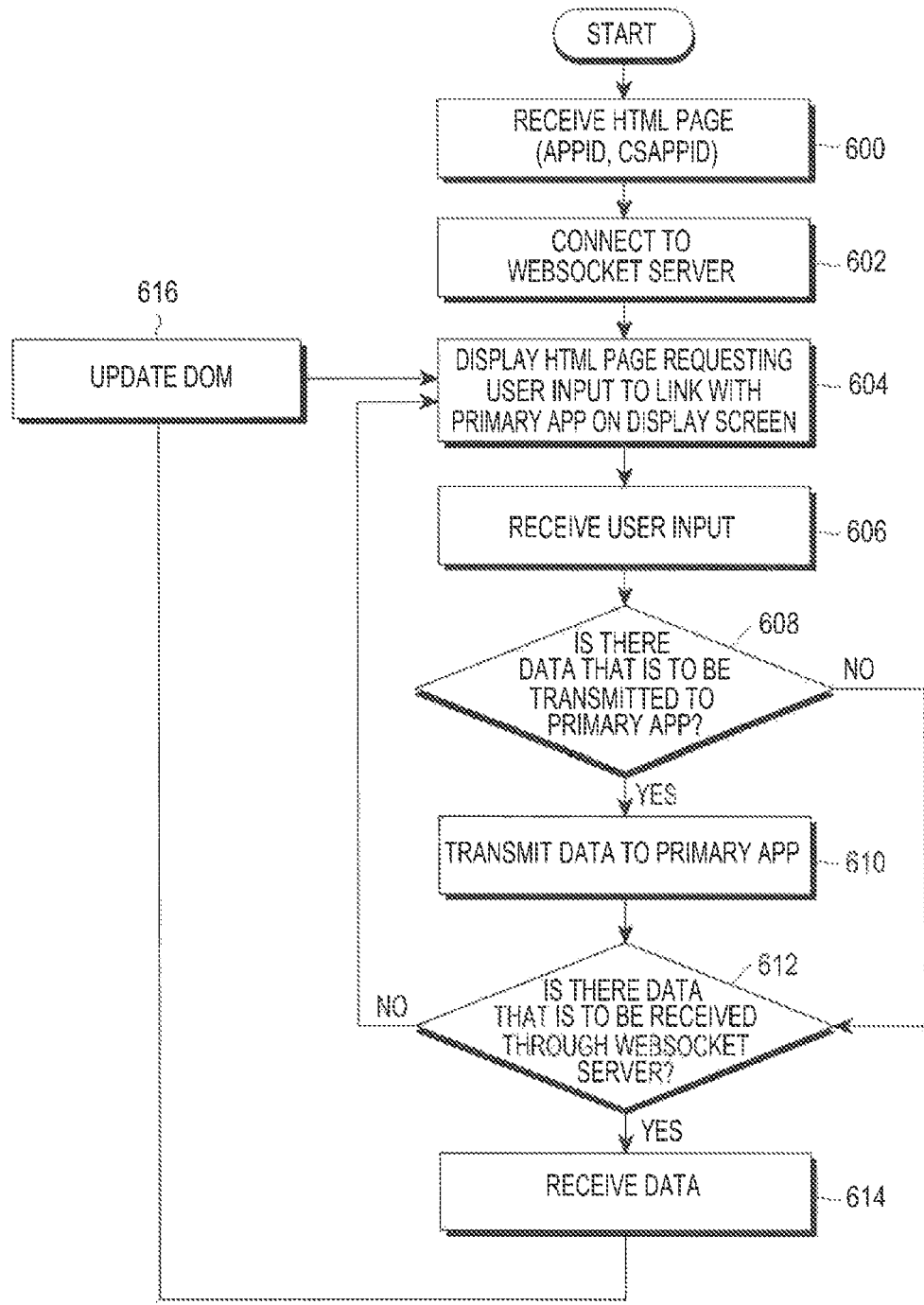
FIG. 6 is a flowchart illustrating an example of an operation method of a second device according to an embodiment of the present disclosure.

FIG. 6 is a flowchart illustrating an example of an operation method of a second device according to an embodiment of the present disclosure.

Referring to FIG. 6, it is assumed that a second device receives a HTML page which is information transmitted from the first device in operation 506 of FIG. 5, in operation 600. In the current example, for convenience of description, it is assumed that a CS App of the second device is a web application, and the second device receives a HTML page. However, according to another example, if information received by the second device from the first device in operation 600 indicates a native application of the second device, the second device may start the native application.

Then, the CS App of the second device may connect to a WS server of the first device using a CSAppID of the second device and an App ID of the first device acquired from the HTML message, in operation 602.

Then, the second device may display a HTML page for requesting a user input to interwork with a Primary App of the first device, on a display screen, in operation 604. If the second device receives a user input in operation 606, the second device may determine whether there is data that is to be transmitted to the Primary App of the first device, according to the user input, in operation 608. If the second device determines that there is no data that is to be transmitted to the Primary App of the first device, according to the user input, the second device may proceed to operation 612.

If the second device determines that there is data that is to be transmitted to the Primary App of the first device, according to the user input, the second device may transmit the data to the Primary App of the first device through the WS server of the first device connected in operation 602, in operation 610.

Meanwhile, the second device may determine whether there is data that is to be received through the WS server, in operation 612. If the second device determines that there is data that is to be received, the second device may receive the data, in operation 614. Then, the second device may reflect the received data to update DOM, in operation 616. Thereafter, the second device may return to operation 604 to reconfigure HTML based on the result of the updating, and display the reconfigured HTML on its own display screen.

Meanwhile, if the second device determines in operation 612 that there is no data that is to be received through the WS server, the second device may return to operation 604 to wait another user input.

Figure 7:
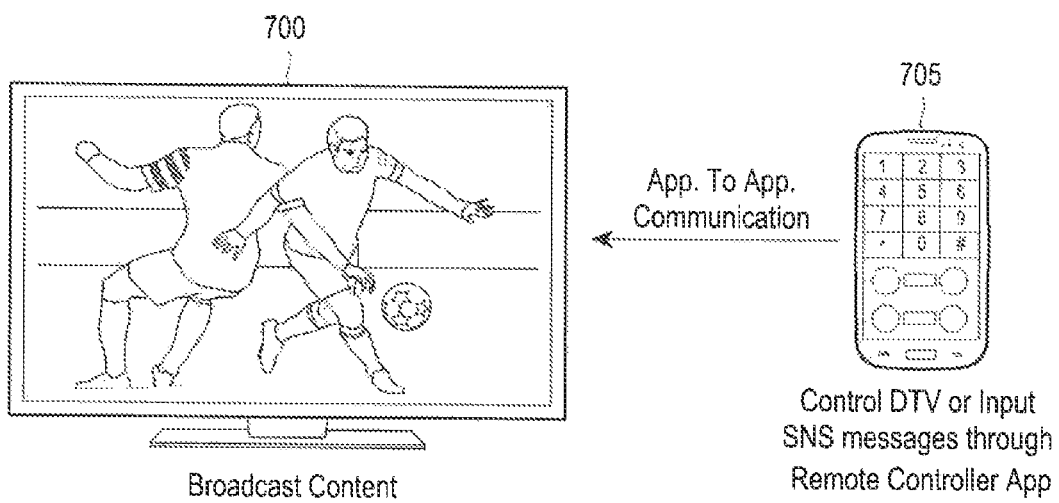
FIG. 7 is a view for describing an embodiment to which the present disclosure is actually applied.

FIG. 7 is a view for describing an embodiment to which the present disclosure is actually applied.

Referring to FIG. 7, it is assumed that a first device 700 and a second device 705 are connected to a home network. Also, it is assumed that a user controls the first device 700 though the second device 705 when the first device 700 receives broadcasting content. For example, the user may use the second device 705 that enables a user to easily make user inputs to remotely control the first device 700 or to make a user input such as operation of inputting a character(s). Also, the user may use the second device 705 to select a screen displayed according to the broadcasting content of the first device 700, to execute an application provided for each broadcasting content, or to take a vote. The first device 700 may include a WS server to provide a connection and communication between an application running on the first device 700 and an application running on the second device 705 and configured to manipulate the first device 700, as described above.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for communication between a first application on a first device and a second application on a second device, the method comprising:
    connecting, by the first device, the first application to the second application through a websocket server in the first device; and
    transmitting, by the first device, data from the first application to the second application through the websocket server, or receiving, by the first device, data for the first application from the second application through the websocket server,
    wherein a connection between the first application and the second application through the websocket server is provided based on the websocket server receiving a connection request from each of the first application and the second application, and wherein the connection between the first application and the second application through the websocket server is based on a websocket uniform resource locator (URL) related with a resource name related to the first application, and information specific to the second application.

2. The method of claim 1,
    wherein a first connection between the websocket server and the first application is provided using a protocol of the web socket server, and
    wherein a second connection between the websocket server and the second application is provided using the protocol of the websocket server.

3. The method of claim 2, wherein the first connection and the second connection are relayed through the websocket server to establish a communication channel between the first application and the second application.

4. The method of claim 3, wherein the first connection and the second connection are allocated with a same channel identifier.

5. The method of claim 1, wherein the connection between the first application and the second application is disconnected in response to receiving, by the websocket server, a disconnection request from each of the first application and the second application.

6. The method of claim 1, wherein the connection between the first application and the second application through the websocket server is provided after a user input by at least one of a user of the first device or a user of the second device input in response to a displayed request for the user input.

7. A first device for communication between a first application on the first device and a second application on a second device, the first device comprising:
    a websocket server;
    a communication interface; and
    a controller coupled to the communication interface,
    wherein the controller is configured to:
        connect the first application to the second application through the websocket server, and
        transmit data from the first application to the second application through the websocket server, or receive data for the first application from the second application,
    wherein a connection between the first application and the second application through the websocket server is provided based on the websocket server receiving a connection request from each of the first application and the second application, and
    wherein the connection between the first application and the second application through the websocket server is based on a websocket uniform resource locator (URL) related with a resource name related to the first application and information specific to the second application.

8. The first device of claim 7,
    wherein a first connection between the websocket server and the first application is provided using a protocol of the web socket server, and
    wherein a second connection between the websocket server and the second application is provided using the protocol of the websocket server.

9. The first device of claim 8, wherein the first connection and the second connection are relayed through the websocket server to establish a communication channel between the first application and the second application.

10. The first device of claim 9, wherein the first connection and the second connection are allocated with a same channel identifier.

11. The first device of claim 7, wherein the connection between the first application and the second application is disconnected in response to receiving, by the websocket server, a disconnection request from each of the first application and the second application.

12. The first device of claim 7, wherein the connection between the first application and the second application through the websocket server is provided after a user input by at least one of a user of the first device or a user of the second device input in response to a displayed request for the user input.

* * * * *